US010365387B1

(12) United States Patent
Zhao et al.

(10) Patent No.: US 10,365,387 B1
(45) Date of Patent: Jul. 30, 2019

(54) METHOD FOR SECONDARY EXPLORATION OF OLD OIL AREA IN FAULT SUBSIDENCE BASIN

(71) Applicant: DAGANG OIL FIELD OF CNPC, Tianjin (CN)

(72) Inventors: Xianzheng Zhao, Tianjin (CN); Fengming Jin, Tianjin (CN); Lihong Zhou, Tianjin (CN); Wenya Jiang, Tianjin (CN); Xiugang Pu, Tianjin (CN)

(73) Assignee: DAGANG OIL FIELD OF CNPC, Tianjin (CN)

( * ) Notice: Subject to any disclaimer, the term of this patent is extended or adjusted under 35 U.S.C. 154(b) by 0 days.

(21) Appl. No.: 16/242,331

(22) Filed: Jan. 8, 2019

(30) Foreign Application Priority Data

Jan. 8, 2018 (CN) .......................... 2018 1 0016522

(51) Int. Cl.
G06F 11/30 (2006.01)
G01V 1/30 (2006.01)
E21B 47/00 (2012.01)
G01V 1/36 (2006.01)
G01V 1/00 (2006.01)

(52) U.S. Cl.
CPC .......... *G01V 1/302* (2013.01); *E21B 47/0007* (2013.01); *G01V 1/003* (2013.01); *G01V 1/36* (2013.01)

(58) Field of Classification Search
CPC ..................................... G01V 1/302
See application file for complete search history.

(56) References Cited

U.S. PATENT DOCUMENTS

2013/0043025 A1* 2/2013 Scott .............. E21B 43/305
166/276
2018/0080313 A1* 3/2018 Altundas ............ G01V 1/308

* cited by examiner

*Primary Examiner* — Phuong Huynh
(74) *Attorney, Agent, or Firm* — Volpe and Koenig, P.C.

(57) ABSTRACT

The present invention discloses a method for overall exploration of a mature exploration area of oil-rich sags, the method including the following steps: building an area-wide seismic sequence framework for a study area based on uniform 3D seismic data of the study area; determining the spatial distribution characteristics of sedimentary reservoirs in the study area by sequence based on the area-wide seismic sequence framework; grading source rocks in the study area by sequence based on the area-wide seismic sequence framework; counting the spatial distribution characteristics of caprocks in the study area; determining a transporting system for the study area based on the unified 3D seismic data of the study area; classifying potential trap areas in the study area based on the spatial distribution characteristics of the sedimentary reservoirs and the spatial distribution characteristics of the caprocks; and deploying the overall exploration of the study area based on the classification of the potential trap areas, grading of the source rocks and the transporting system of the study area.

11 Claims, 8 Drawing Sheets

FIG. 4

METHOD FOR SECONDARY EXPLORATION OF OLD OIL AREA IN FAULT SUBSIDENCE BASIN

CROSS-REFERENCE TO RELATED APPLICATIONS

The present application claims the priority of Chinese Patent Application No. 201810016522.9 filed on Jan. 8, 2018, entitled "method for overall exploration of mature exploration area of oil-rich sags" which is incorporated herein by reference.

TECHNICAL FIELD

The present invention relates to an exploration method, and more especially, to a method for overall exploration of a mature exploration area of oil-rich sags, belonging to the technical field of petroleum exploration.

BACKGROUND OF THE INVENTION

Great success has been achieved in the exploration of oil-rich sags, mainly Bohai Bay Basin. The size of oil reservoirs in the mature exploration areas have been basically defined, but oil-rich sags still have abundant oil resources. Nowadays, we find oil resources unbalanced and encounter a technical bottleneck in how to search for remaining oil resources. Concerning the problems above, the present invention aims to provide a method for overall exploration of a mature exploration area of oil-rich sags.

BRIEF SUMMARY OF THE INVENTION

Concerning the problems above, the present invention aims to provide a method for overall exploration of a mature exploration area of oil-rich sags so as to provide feasible technical support for the overall exploration of structural-stratigraphic-lithologic oil reservoirs of oil-rich sags in lake basins, in particular, selection of favorable zones and discovery of uncompartmentalized reservoir areas.

To realize the purposes above, the present invention provides a method for overall exploration of a mature exploration area of oil-rich sags, comprising: building an area-wide seismic sequence framework for a study area based on uniform 3D seismic data of the study area; determining the spatial distribution characteristics of sedimentary reservoirs in the study area by sequence based on the area-wide seismic sequence framework; grading source rocks in the study area by sequence based on the area-wide seismic sequence framework; counting the spatial distribution characteristics of caprocks in the study area; determining a transporting system for the study area based on the unified 3D seismic data of the study area; classifying potential trap areas in the study area based on the spatial distribution characteristics of the sedimentary reservoirs and the spatial distribution characteristics of the caprocks; and deploying the overall exploration of the study area based on the classification of the potential trap areas, grading of the source rocks and the transporting system of the study area.

The beneficial effects of the present invention are as follows:

1) seismic data for blind zones in exploration are added by making full use of existing exploration achievements to create a unified seismic data volume of the depression-wide capable of meeting current exploration needs, laying a data foundation for the overall exploration in the depression;

2) The combinational spatial relationships of faults, strata, reservoirs, caprocks and source rocks are taken into overall consideration and potential oil reservoirs are ordered so that favorable potential oil reserves are explored first and deployment by level and discovery in scales are made possible;

3) In the overall exploration, the next drilling target is adjusted in time based on the feedback information from the exploratory well so that the success rate of well exploration is steadily improved for the timely adjustment in discovery.

BRIEF DESCRIPTION OF THE DRAWINGS

FIG. 4 shows the sequence stratigraphic subdivision and sedimentary facies identification results of the Paleogene System according to the present invention;

DETAILED DESCRIPTION OF THE INVENTION

The technical solution in the embodiments of the present invention will be clearly and thoroughly described hereafter in conjunction with the drawings in the embodiments of the present invention. Obviously, the embodiments described are merely part of embodiments of the present invention, not all embodiments. All other embodiments obtained by those skilled in the art without making innovative efforts based on the embodiments herein are in the protection scope of the present invention.

Figure 1:
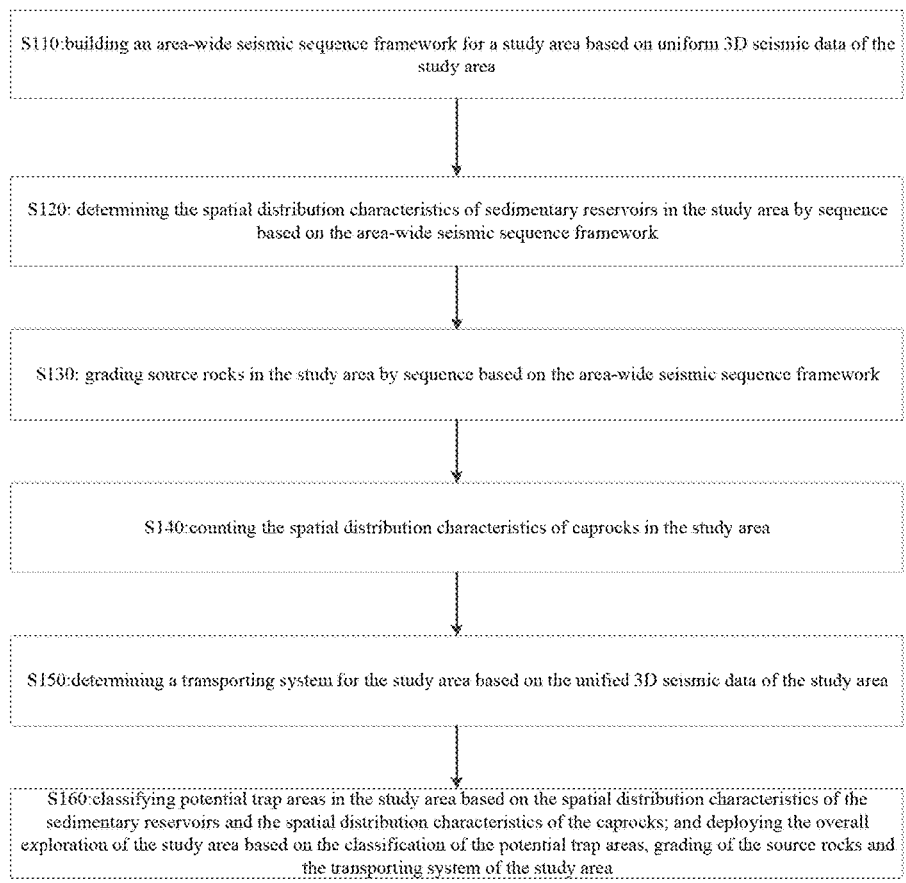
FIG. 1 shows a flow diagram of the method for overall exploration of oil-rich sags provided in the present invention.

As shown in FIG. 1, the present invention provides a method for overall exploration of a mature exploration area of oil-rich sags, including the following steps:

Step S110: building an area-wide seismic sequence framework for a study area based on unified 3D seismic data of the study area;

Step S120: determining the spatial distribution characteristics of sedimentary reservoirs in the study area by sequence based on the area-wide seismic sequence framework;

Step S130: grading source rocks in the study area by sequence based on the area-wide seismic sequence framework;

Step S140: counting the spatial distribution characteristics of caprocks in the study area;

Step S150: determining a transporting system for the study area based on the unified 3D seismic data of the study area; and Step S160: classifying potential trap areas in the study area based on the spatial distribution characteristics of the sedimentary reservoirs and the spatial distribution characteristics of the caprocks; and deploying the overall exploration of the study area based on the classification of the potential trap areas, grading of the source rocks and the transporting system of the study area.

The unified 3D seismic data of the study area can be acquired in the following steps:

In the first place, the areas not meeting the requirements for coverage folds of 3D seismic data are determined from a structural distribution map of the study area, the preset requirements for coverage folds of 3D seismic data of different tectonic positions and a prior plan of coverage folds of 3D seismic data in the study area. Specifically, the structural distribution map and the prior plan of coverage folds of 3D seismic data in the study area may be acquired; then a plan of coverage folds of 3D seismic data needed for the overall exploration can be drawn from the structural distribution map and the preset requirements for coverage folds of 3D seismic data for different tectonic positions in the study area; the plan of coverage folds of 3D seismic data needed for the overall exploration and the prior plan of coverage folds of 3D seismic data in the study area are contrasted to determine the areas not meeting the requirements for coverage folds of 3D seismic data, wherein the preset requirements for coverage folds of 3D seismic data for different structures include: the range of coverage folds of 3D seismic data of a high slope is 60-80, the range of coverage folds of 3D seismic data of a medium slope is 80-120, the range of coverage folds of 3D seismic data of a low slope is 160-200, and the range of coverage folds of 3D seismic data of an interior of buried hill is 180-220.

Secondly, 3D seismic data is acquired for the areas not meeting the requirements for coverage folds of 3D seismic data to get current 3D seismic data so that the areas meet the requirements for folds of 3D seismic data.

In the last place, the prior 3D seismic data and the current 3D seismic data of the study area may be combined to form the unified 3D seismic data of the study area, wherein the prior 3D seismic data refer to that before the acquisition for the study area.

Seismic data for blind zones in exploration are added by making full use of previous exploration achievements in the steps above to create a unified seismic data volume of the depression-wide capable of meeting current exploration needs, laying a data foundation for the overall exploration in the depression.

Figure 2:
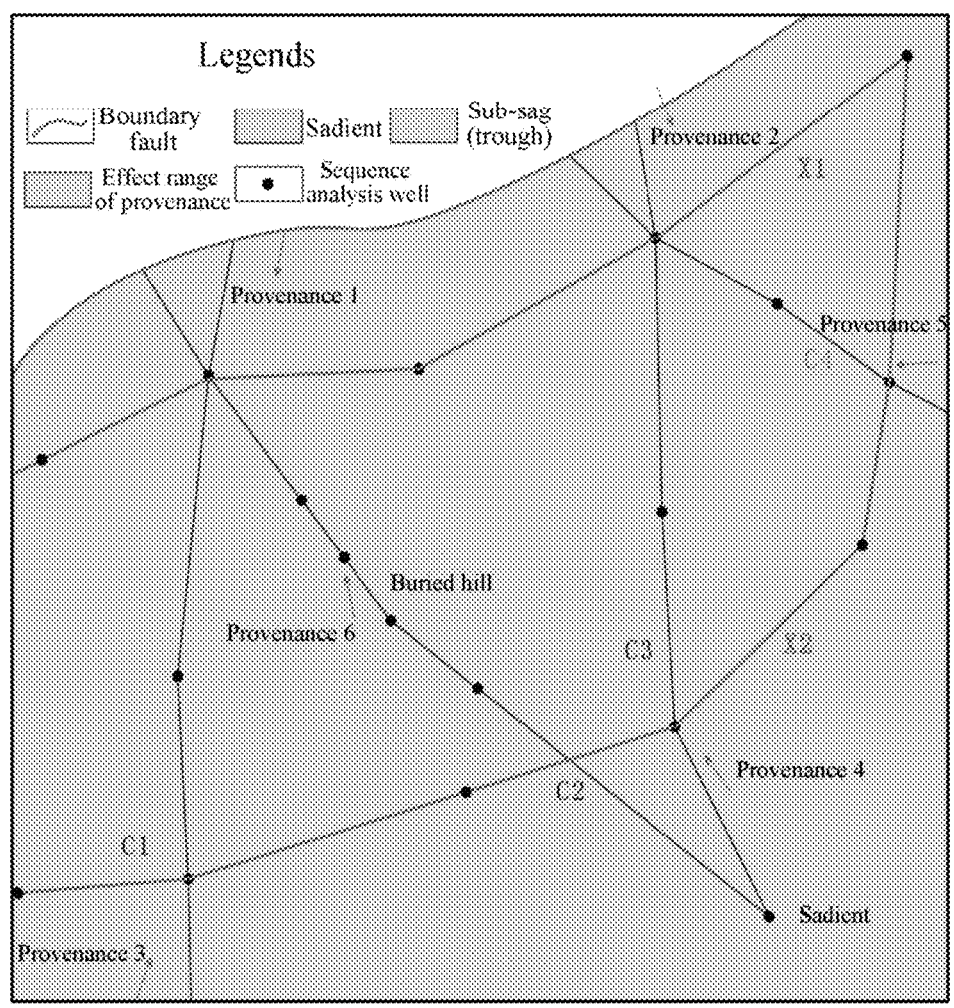
FIG. 2 shows a method of selecting a single well for the sequence stratigraphic framework according to the present invention.

Step S110 that building an area-wide seismic sequence framework for the study area based on unified 3D seismic data of the study area may include the following steps:

Step S102: framework wells are selected in the study area, based on the preset conditions for selecting framework wells. Specifically, wells selected preferably have fully developed strata, sustain a minor impact of faults and abound with well logging, mud logging, coring, and testing data. Furthermore, one well may be selected within the effect range of each provenance as the framework well, one well may be selected between any two adjacent provenances as the framework well, and one well may be selected in the buried hill and salient respectively as the framework well (as shown in FIG. 2). The "well" refers to an existing drilled well.

In Step S104, framework wells (including framework wells between adjacent provenances) in the effect range of provenances are connected together along the trend of a basin (or depression) to create a cross section transverse to the provenance direction (as shown in X1 and X2 in FIG. 2) and framework wells (including framework wells between adjacent provenances) in respective effect ranges of two mutually corresponding provenances are connected together along the dip direction of the basin (or depression) to create a cross section along the provenance direction (as shown in C1, C2, C3 and C4 in FIG. 2), i.e., framework wells in the effect range of provenances are connected along the trend and dip direction of the basin or framework wells in the effect range of provenances are connected along the trend and dip direction of the depression to create a cross section along the provenance direction, wherein framework wells can be increased duly if the section cross covers a large area in the connection. Step S104 aims at dividing into three orders of sequences using the single-well sequence stratigraphic subdivision method to build a sequence stratigraphic framework.

In step S106, for each framework well in the cross section transverse to the provenance direction and the cross section along the provenance direction, the seismic reflection in-phase axis of the three orders of sequence interfaces corresponding to the framework wells are found from the unified 3D seismic data using the synthetic seismogram of the framework wells, and in-phase axis tracking are performed in a 3D space according to in-phase axis termination relations of onlap, down-lap, top-lap, and truncation in the seismic reflection interface to build the area-wide seismic sequence framework.

In step S120, the spatial distribution characteristics of the sedimentary reservoirs may include the location distribution of the sedimentary reservoirs and the classification of the sedimentary reservoirs and the determination of the spatial distribution characteristics of the sedimentary reservoirs in the study area by sequence based on the area-wide seismic sequence framework may include the following steps:

In Step S202, the location distribution of the sedimentary reservoirs in the study area is determined by sequence from the unified 3D seismic data based on the area-wide seismic sequence framework. The location distribution of the sedimentary reservoirs can be determined from wave length and frequency among the 3D seismic data. Upon determination of the location of the sedimentary reservoirs, for example, a distribution plan of the sedimentary reservoirs may be drawn by sequence under the sequence framework.

In Step S204, each sedimentary reservoir can be classified according to its porosity and permeability. The reservoirs can be classified based on acquired porosity and permeability test data and the results of interpretation of physical properties of the well logging. The sedimentary reservoirs can be classified as below by porosity and permeability:

High-porosity and high-permeability reservoirs: the porosity is greater than 30% and the permeability is greater than $500 \times 10^{-3}$ $\mu m^2$;

Medium-porosity and medium-permeability reservoirs: the porosity is greater than 30-20% and the permeability is greater than 500-100×10$^{-3}$ μm$^2$;

Medium-porosity and low-permeability reservoirs: the porosity is greater than 20-10% and the permeability is greater than 100-10×10$^{-3}$ μm$^2$;

Low-porosity and low-permeability reservoirs: the porosity is greater than 15-10% and permeability is greater than 10-1×10$^{-3}$ μm$^2$;

Tight reservoirs: the porosity is lower than 10%, the permeability is lower than 1×10$^{-3}$ μm$^2$ but the brittleness index is greater than 46%.

Upon classification of the sedimentary reservoirs, the classification of the sedimentary reservoirs can be added to the drawn distribution plan of the sedimentary reservoirs by sequence.

The Step S130 that grading the source rocks in the study area by sequence based on the area-wide seismic sequence framework includes:

Step S302, the total organic carbon content (TOC) of the source rocks is calculated.

Before calculation of the TOC of the source rocks, tectonic units in the study area may be divided first.

In the division of the exploration units, a 3D interpretation of fractures may be made for the study area first. For example, distribution characteristics of the fractures may be interpreted through a structure-oriented filtering data volume. Then the faults can be divided into, for example, the following levels:

Level I faults: extending between 44 km and 85 km and the fault throw being 3 km-7 km, such faults control a basin;

Level II faults: extending between 14 km and 30 km and the fault throw being 150 m-4 km, such faults control the secondary tectonic units in a sag;

Level III faults: extending between 4 km and 30 km, the fault throw being 50 m-200 m, such faults are secondary accommodation faults between Level I and Level II faults;

Level IV faults: extending less than 10 km, the fault throw being 100 m, changeable directions, in large quantities and widely distributed.

Upon the fault division, the datum plane of each structure can be determined. A fault subsidence basin generally experiences early subsidence sedimentation and late depression sedimentation in the evolution. At the subsidence sedimentation stage, affected by syn-sedimentary fault, the thickness of strata increases of a sudden at the downthrown side of the fault. At the depression sedimentation stage, the thickness of strata gradually increases towards the center of sedimentation and shows a progressive characteristic under a decreased control of the fault. Layers of transition between the fault subsidence sedimentation stage and the depression sedimentation stage are determined as marker layers for division of the tectonic units, the ½ line of the tectonic transition layers is determined as the datum line for division of structures, and the plane formed by tectonic datum lines is the datum plane, and a plurality of datum planes may be determined. Upon the determination of tectonic datum planes, tectonic units can be divided into the following types based on the tectonic datum planes:

Slope areas: the areas divided by the tectonic datum plane are slope areas;

Salient areas: the areas are those outside the tectonic datum plane and the boundaries thereof are controlled by Level II faults;

Uplifted areas: the areas are those outside the tectonic datum planes and the boundaries thereof are controlled by Level I faults;

Generally, the slope areas account for more than 70% of the exploration area, and are further divided into high slope areas, medium slope areas and low slope areas by the maturity of source rocks, wherein the reflectance of vitrinite in the high slope areas is lower than 0.7%, the reflectance of vitrinite in the medium slope areas is 0.7%-1.0% and the reflectance of vitrinite in the low slope areas is greater than 1%.

Then, a TOC well logging evaluation model can be built by sequence in the divided tectonic units. TOC test analysis data in the study area, acoustic time difference and resistivity well logging data of all wells are acquired. The TOC, acoustic time difference (AC) and resistivity (R) satisfy the following relation:

$$TOC = k \times (R - AC) + \Delta TOC$$

wherein k represents organic carbon conversion coefficient and ΔTOC refers to the background value of TOC of source rocks. An actual value of the TOC can be measured through sampling and then is fit with corresponding acoustic time difference and resistivity to get the values of k and ΔTOC. If the TOC calculated from the values of k and ΔTOC obtained by fitting does not match the actual value measured, sampling data shall be increased to give more precise values of k and ΔTOC to improve the model.

Furthermore, the source rocks can be graded based on the calculated TOC of the source rocks, wherein the source rocks whose TOC is greater than 2% are determined as good source rocks, the source rocks whose TOC is 1%-2% are determined as medium source rocks and the source rocks whose TOC is 0.5%-1% are determined as poor source rocks. And a statistics may be further taken of the thickness values of different types of source rocks by sequence to prepare an industrial drawing, wherein the thickness values of the source rocks can be obtained from the well logging data. Upon the statistics of the thickness values of the source rocks different in quality, a planar distribution of the source rocks different in quality can be determined.

In Step S140, the spatial distribution characteristics of the caprocks can cover at least a classification of the caprocks. By lithology, the caprocks can fall into mudstone, silty mudstone, pelitic siltstone, shale, gypsum stone, rock salt, marl, argillaceous limestone, tight limestone and the like. The caprocks can be divided into good, medium, average and poor caprocks by air permeability, wherein the caprocks whose air permeability is lower than 10$^{-8}$ μm$^2$ are determined as good caprocks, the caprocks whose air permeability is 10$^{-8}$-10$^{-7}$ μm$^2$ are determined as medium caprocks, the caprocks whose air permeability is 10$^{-7}$-10$^{-6}$ μm$^2$ are determined as average caprocks, and the caprocks whose air permeability is 10$^{-5}$-10$^{-3}$ μm$^2$ are determined as poor caprocks.

Further in Step S140, the spatial distribution characteristics of the caprocks can also include caprock thickness, wherein the caprocks whose thickness is greater than the preset thickness are determined as effective caprocks. For instance, the caprocks whose layer thickness is greater than 1 m can be determined as the effective caprocks. A cumulative thickness value of the caprocks of all types in a single well is counted by sequence and an isogram is drawn.

In Step S150, the transporting system can comprise a fault transporting system, an unconformity transporting system and a sandstone transporting system.

The fault transporting system can comprise Level I faults and Level II faults, wherein as mentioned above, the faults extending between 44 km and 85 km and with the fault throw of 3 km-7 km are level I faults; and the faults extending between 14 km and 30 km and with the fault throw of 150 m-4 km are Level II faults. With a great throw and a plurality of communication horizons, Level I faults and Level II faults are main channels for vertical migration of oil.

The unconformity separates new strata from old ones and the underlying strata beneath the unconformity are regionally truncated or locally truncated. By the planar distribution scale of the unconformity, unconformities are divided to three levels, wherein Level I unconformities are controlled by regional tectonic activities and pervasively developed in a basin, corresponding to Level II sequence interfaces; Level II unconformities are controlled by episodic tectonic activities and distributed in uplifts, salients, high slopes and high slope areas, corresponding to Level III sequence interfaces; Level III unconformities are controlled by fluctuations of the lake level and combining lithologic cycles and transitional sides, have local unconformity in the periphery of the uplifts and salients, corresponding to system tract interfaces. The distribution scope of unconformities determines the planar transporting ability, wherein Level I unconformities have a transporting ability in basins, Level II unconformities have a transporting ability in uplifts, salients, high slope and medium slope areas, and Level III unconformities have a transporting ability on the periphery of uplifts and salients.

The sandstone transporting system can comprise a Level I transporting sand body, a Level II transporting sand body and a Level III transporting sand body. The sandstone percentage of the Level I transporting sand body, the Level II transporting sand body and the Level III transporting sand body is greater than 70%, 50%-70% and 30%-50% respectively, wherein a distribution plan of the sandstone percentage can be prepared by system tract, and favorable transporting sand body distribution maps are circled by percentage size.

In Step S160, the potential trap areas in the study area can be classified to determine the potential trap areas by grade based on the spatial distribution characteristics of the sedimentary reservoirs and those of the caprocks. In the present invention, a total of three classes of the potential trap areas are divided from the combinational relationships between the reservoirs and the caprocks as shown in Table 1, including a total of 17 reservoir-caprocks combinations

TABLE 1

| Class of traps | Subclass of traps | Trap type | Porosity and permeability | Condition of caprocks | Grading of potential oil reserves |
|---|---|---|---|---|---|
| Class I | Class I-1 | 1 | High porosity and high permeability | Good caprocks | 1a, 1b and 1c |
| | | 2 | Medium porosity and medium permeability | Good caprocks | 2a, 2b and 2c |
| | Class I-2 | 3 | High porosity and high permeability | Medium caprocks | 3a, 3b and 3c |
| | | 4 | High porosity and high permeability | Average caprocks | 4a, 4b and 4c |
| | | 5 | Medium porosity and medium permeability | Medium caprocks | 5a, 5b and 5c |
| | | 6 | Medium porosity and medium permeability | Average caprocks | 6a, 6b and 6c |
| | Class I-3 | 7 | High porosity and high permeability | Poor caprocks | 7a, 7b and 7c |
| | | 8 | Medium porosity and medium permeability | Poor caprocks | 8a, 8b and 8c |
| Class II | Class II-1 | 9 | Medium porosity and low permeability | Good caprocks | 9a, 9b and 9c |
| | | 10 | Medium porosity and low permeability | Average caprocks | 10a, 10b and 10c |
| | Class II-2 | 11 | Low porosity and low permeability | Good caprocks | 11a, 11b and 11c |
| | | 12 | Medium porosity and low permeability | Medium caprocks | 12a, 12b and 12c |
| | | 13 | Medium porosity and low permeability | Poor caprocks | 13a, 13b and 13c |
| | | 14 | Low porosity and low permeability | Medium caprocks | 14a, 14b and 14c |
| | | 15 | Low porosity and low permeability | Average caprocks | 15a, 15b and 15c |
| | | 16 | Low porosity and low permeability | Poor caprocks | 16a, 16b and 16c |
| Class III | Class III | 17 | Tight reservoir | | 17 |

In Table 1, the combinations of sedimentary reservoirs and caprocks in Class I potential trap areas have sound porosity and permeability, hence reservoirs don't have to be modified in development. The combinations of sedimentary reservoirs and caprocks in Class II potential trap areas have poor porosity and permeability, hence engineering fracturing modification is needed in development. The combinations of sedimentary reservoirs and caprocks in Class III potential trap areas are generally self-generating and self-preserved reservoirs or near-source reservoirs. Through relation combinations of sedimentary reservoirs and caprocks by sequence, favorable trap areas are classified in order and numbered by area.

Upon the determination of the types of potential trap areas, the ability of the potential trap areas communicating with the source rocks through the transporting system is evaluated to select potential oil reservoir areas. The oil and gas migration law is generally that oil and gas are migrated from the source rocks along the transporting system to high spots in structures. If a potential trap can communicate with source rocks through a transporting system, the potential trap area is upgraded as a potential oil reservoir area. Potential oil reservoir areas are further divided into three types, i.e. type a, b and c, by quality of the source rocks communicating with the potential oil reservoir areas, and 49 different categories in total.

Further, the exploration sequence of the study area can be determined from the types of the potential oil reservoir area. The exploration sequence of the study area can be determined to be 1a-16a, 1b-16b and 1c-16c and 17. The first potential oil reservoir areas are Type 1a potential oil reservoir areas. Specifically, a fine structure interpretation, a stratigraphic correlation and a transverse trap ability study can be done for Class 1a potential oil reservoir areas and exploratory wells can be designed for oil reservoirs not discovered so far to determine the first well locations.

In the implementation, potential oil reserve prediction results can be adjusted in real time and well exploration can be implemented in a rolling manner. Upon the implementation of the first well locations, present evaluation results are adjusted in time based on the types of verified or newly discovered source rock sections and reservoirs to make an optimal design of the second well locations and so on until all oil reservoirs are verified.

The present invention provides a feasible and effective method to search for remaining oil resources in oil-rich sags, wherein the combinational spatial relationships of faults, strata, reservoirs, caprocks and source rocks are taken into overall consideration and potential oil reservoirs are ordered so that favorable potential oil reserves are explored first and deployment by level and discovery in scales are made possible.

By example of Langgu Sag in the study area, a detailed description is given to the method for overall exploration of a mature exploration area of oil-rich sags provided in the present invention. Concerning Langgu Sag, the present invention provides a method for overall exploration of a mature exploration area of oil-rich sags, including the following steps:

1) Construction of a Sag-Wide 3D Seismic Data Platform

Figure 3:
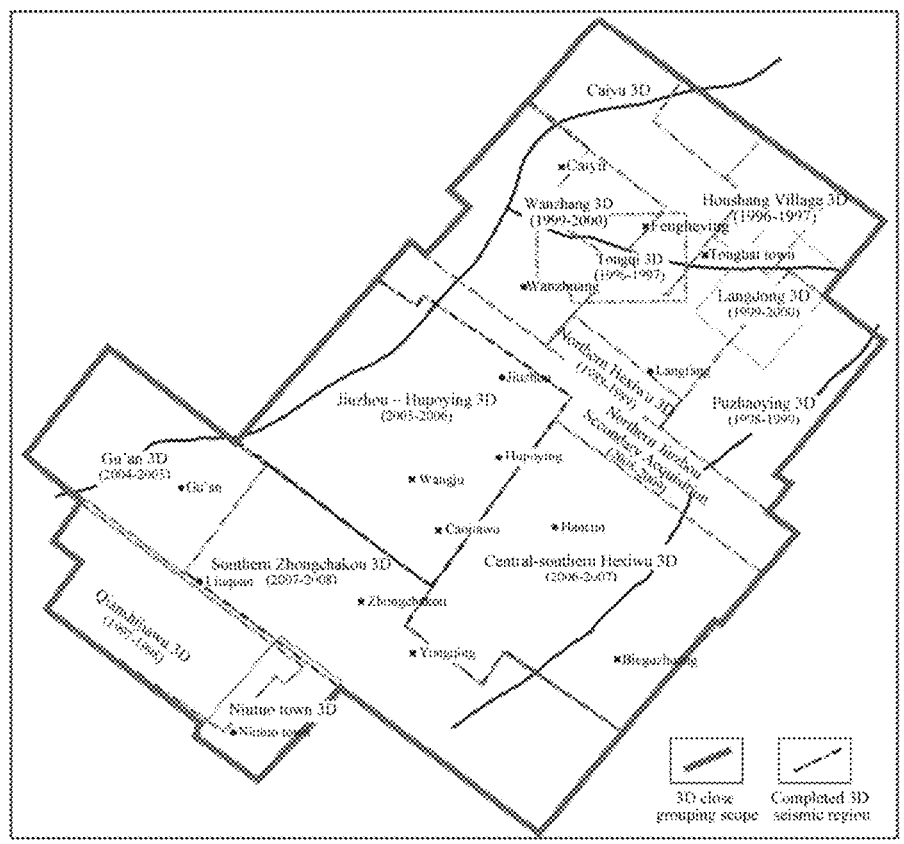
FIG. 3 shows a 3D seismic exploration achievement map of the present invention.

Located in northwestern Jizhong Depression, a total of 14 3D seismic data volumes were acquired in Langgu Sag from 1987 to 2001, covering an area of 1,459.5 km² in total; concerning the overall design requirements for a second exploration, 5 seismic data volumes with up-to-standard coverage folds were selected; a total of 8 3D seismic data volumes covering an area of 1,894.6 km² were acquired in seismic data volumes without up-to-standard 3D seismic data coverage folds and areas without any 3D seismic data from 2004 to 2010. The new and prior 3D seismic data are combined to obtain depression-wide 3D seismic data. Langgu Sag has high-quality 3D seismic data with a full coverage of 2,252 km² (refer to FIG. 3).

2) Building of a Sequence Stratigraphic Framework

① Sequence Stratigraphy Study on Single Wells

Figure 4:
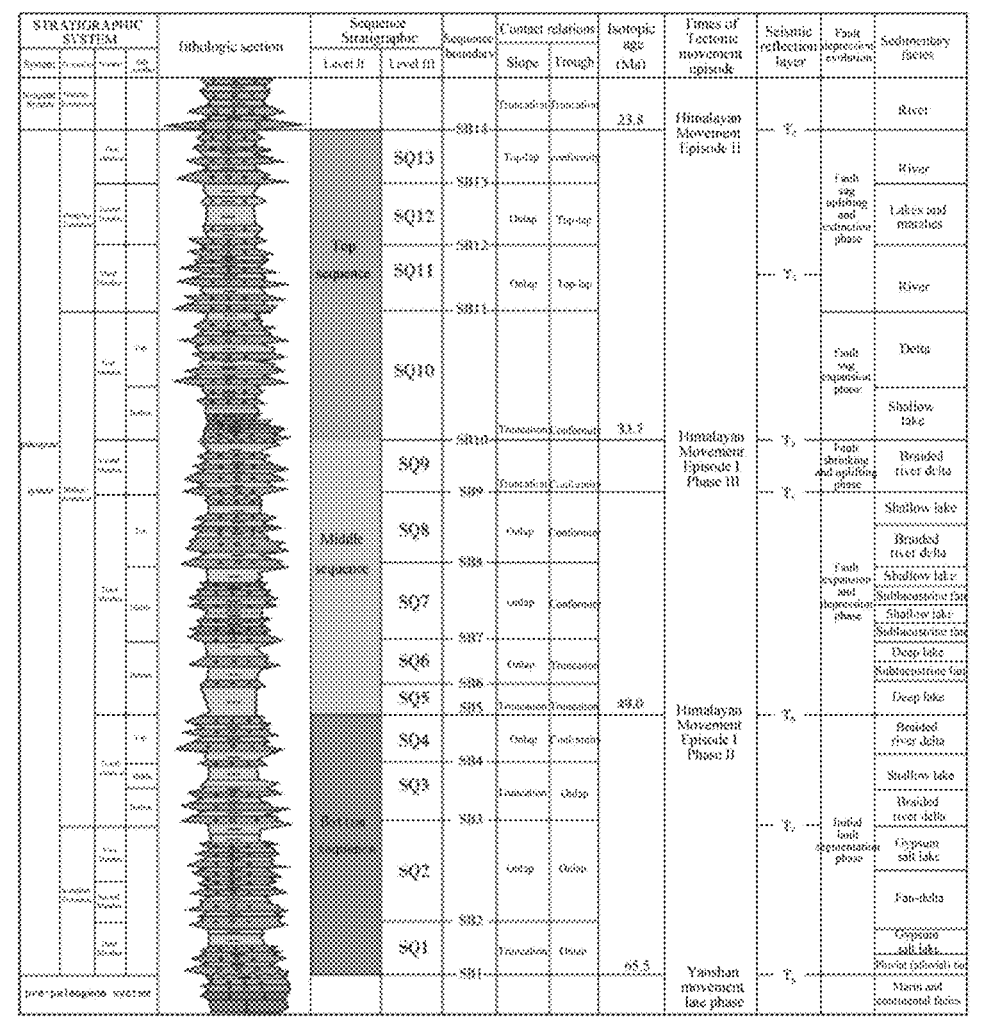

Well logging, mud logging, coring and other testing and analysis data are utilized to recognize uppermost and lowermost Level I sequence interfaces T2 and Tg and Level II sequence interfaces T4 and T6 of the Paleogene System. Further, 14 Level III sequence interfaces of different properties are recognized and numbered SB1~SB14, and 13 Level III sequence units are defined and numbered from the bottom up as SQ1~SQ13 (refer to FIG. 4).

② Selection of Sequence Stratigraphic Framework Wells

Figure 5:
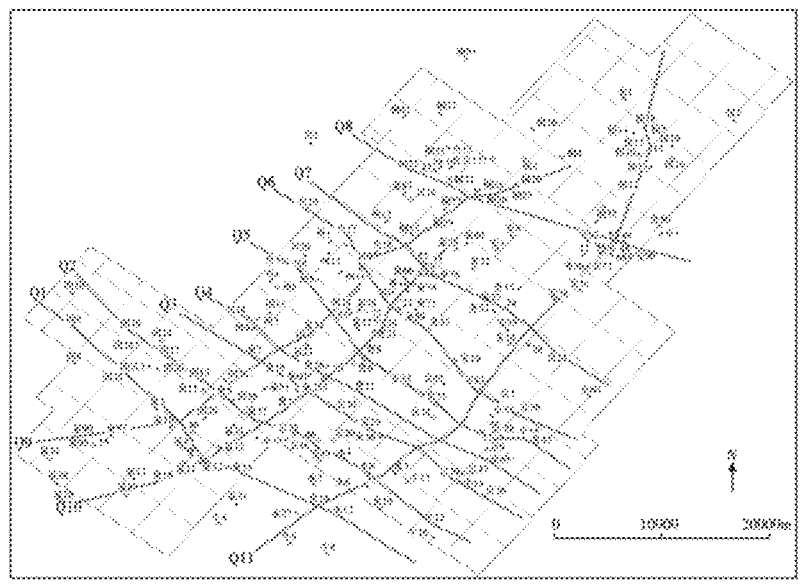
FIG. 5 shows a location section of a well tied framework according to the present invention.

In the selection of the sequence stratigraphic framework wells, by reference to existing exploration results, wells that have intact strata, sustain a minor impact of faults and have no interrupted control or loss of strata are selected in the effect range of provenances; wells within the control range are selected between provenances. Then the wells are connected together in order to select 8 source sections along the provenance direction and 3 cross sections transverse to the provenance direction in the scope of work areas, involving a total of 106 single wells (refer to FIG. 5).

③ Establishment of an Area-Wide Sequence Stratigraphic Framework

Figure 6:
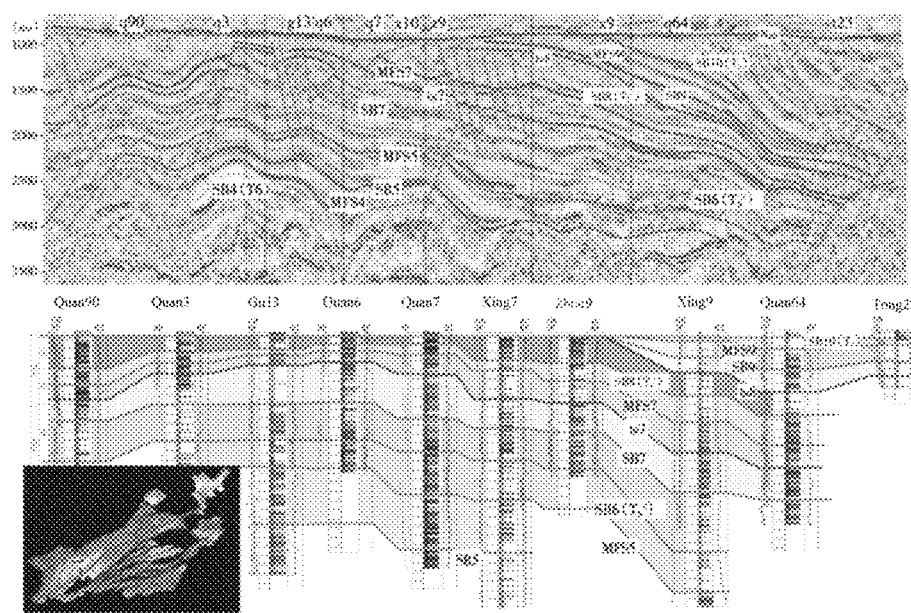
FIG. 6 shows a contrast section of strata frameworks in well-seismic contrast sequence according to the present invention.

A well tie section is created based on the single-well sequence stratigraphy analysis and seismic reflection in-phase axis of strata are found through a time-depth conversion in the seismic section corresponding to the well tie section to create a well-seismic contrast framework section (refer to FIG. 6); in a well-free area, the planar tracking of seismic reflection in-phase axis are conducted to build an area-wide isochronous strata framework based on the onlap, down-lap, top-lap, truncation and other contact relations of seismic reflection.

3) Interpretation of Structures and Division of Exploration Units

① 3D Interpretation and Grading of Seismic Fractures. Relevant Data Volumes are generated through structure-oriented filtering 3D seismic data; sections and fractures are interpreted and fractures are combined in the plane in a 2D window; based on a fracture level judgment criterion, a total of 4 Level II faults, 9 Level III faults and 46 Level IV faults are recognized and Level I faults are not developed in Langgu Sag (refer to FIG. 7).

② Determination of Fundamental Tectonic Units

Prior studies show that faults of the Paleogene System in the study area evolved in the following stages: initial fault segmentation phase, fault expansion and depression phase, fault shrinking and uplifting phase, fault sag expansion phase and fault sag uplifting and extinction phase. The pattern of structures mainly took shape in the fault sag expansion phase, hence the Middle Part of the Third Member of the Shahejie Formation is selected as the datum plane for exploration units.

③ Preparation of a Map of Tectonic Units

Figure 7:
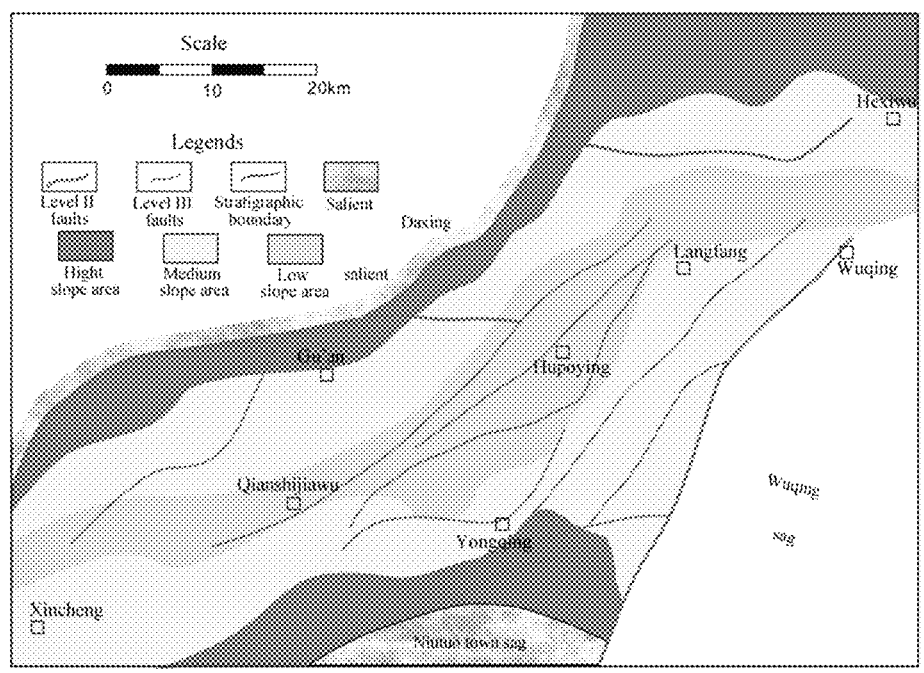
FIG. 7 shows a map of plane distribution of fracture systems and division of exploration units according to the present invention.

Since no Level I faults are distributed in the study area, it is determined that mainly salients and sags are developed in the area; under the datum plane of the middle part of the third member of the Shahejie Formation, a distribution scope of the slope areas and salient areas in Langgu Sag is determined; then the slope areas are further divided into high slope areas, medium slope areas and low slope areas by reflectance of vitrinite of the datum horizons (refer to FIG. 7).

4) Evaluation of the Spatial Distribution of Sedimentary Reservoirs

① Description of the Sedimentary Systems by Series of Strata

Figure 8:
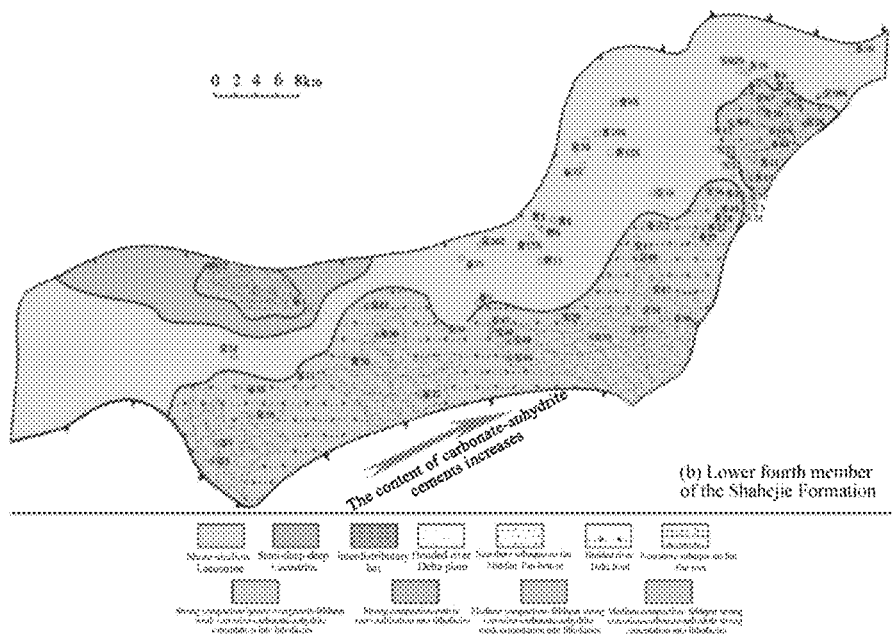
FIG. 8 shows a distribution plan of diagenetic facies associations under the constraint of sedimentary systems according to the present invention.

Under the control of the sequence stratigraphic framework, stratigraphic correlation is conducted for the exploratory and appraisal wells in the whole area are. Sedimentary facies of single wells are judged based on seismic, well logging, mud logging, coring, thin sections and other data, and the distribution plan of the sedimentary systems is prepared under the constraint of seismic properties. For example, the lower fourth member of the Shahejie Formation in Langgu Sag is determined to be mainly a shore, shallow and deep lacustrine environment through single well data, wherein well Quan 1 and well Gu 12 are a semi-deep-deep lacustrine sedimentary environment with a deep water body; a braided river delta and coastal subsea apron are mainly developed in the range of the study area; a plane distribution range of the sedimentary facies is further circled by seismic properties (refer to FIG. 8). Distribution plans for the sedimentary systems in a total of 12 strata units in the three-level sequence framework are completed one by one to fulfill the rebuilding of the sedimentary systems in the sag.

③ Description of the Spatial Distribution Characteristics of Reservoirs by Series of Strata Under the Constraint of the Sedimentary Systems Based on porosity and distribution relations of the sedimentary systems and in combination with diagenetic evolution characteristics, characteristics of good reservoirs of all series of strata and a planar distribution pattern of the favorable reservoirs under the constraint of the sedimentary systems are determined. The lower fourth member of the Shahejie Formation is taken as an example, wherein the lower fourth member of the Shahejie Formation in Langgu Sag in a strong compression state is believed to take fan-delta sediments as main reservoir sand bodies under a quartz overgrowth-feldspar corrosion-carbonate-anhydrite cementation effect through a polymerization relation of physical properties of the reservoirs and sedimentary facies. In a medium compaction state, strong feldspar corrosion-weak carbonate cementation diagenetic facies are secondary reservoir sand bodies; by the plane distribution characteristics of the sedimentary systems, a planar distribution scope of favorable sand bodies is circled (refer to FIG. 8).

5) Evaluation of the source rocks by series of strata

① TOC Well Logging Evaluation Model

Well Xin'an 92 is selected as a standard well to build a TOC well logging evaluation model. A model is obtained through linear fitting (R-AC) and measuring TOC values:

$$TOC=2.4039 \times (R-AC)+0.3831$$

Upon the building of the TOC well logging evaluation model, the TOC values of well An 29, well Cao 5, well Gugu 1, well Quan 56 and well Xing 9 are calculated using the model and compared with measured values to give a relevance of 0.82, indicating that the model built can be used in the area-wide TOC well logging evaluation.

② Building of a TOC Well Tie Section

Figure 9:
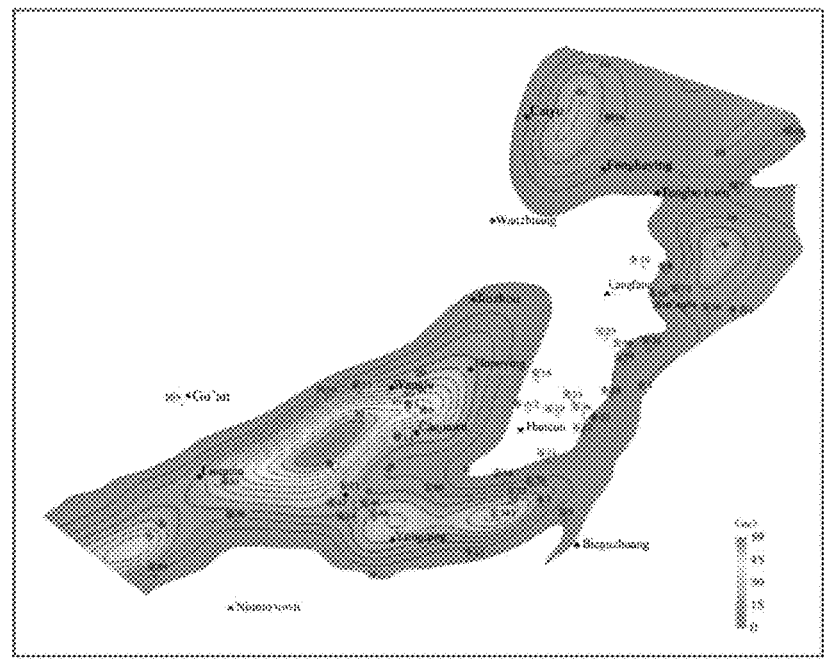
FIG. 9 shows an isopach map of good source rocks in the upper fourth member of the Shahejie Formation according to the present invention.

The TOC well logging evaluation model is used to calculate the TOC values of the sequence stratigraphic framework wells selected in step B and according to the quality evaluation criterion for source rocks: the TOC of good source rocks, medium source rocks and poor source rocks is greater than 2%, 1%-2% and 0.5%-1% respectively, a statistics is taken of the thickness values of the source rocks different in quality, and a planar distribution plan of the source rocks different in quality is determined (refer to FIG. 9).

6) Evaluation of the Caprocks by Series of Strata

Figure 10:
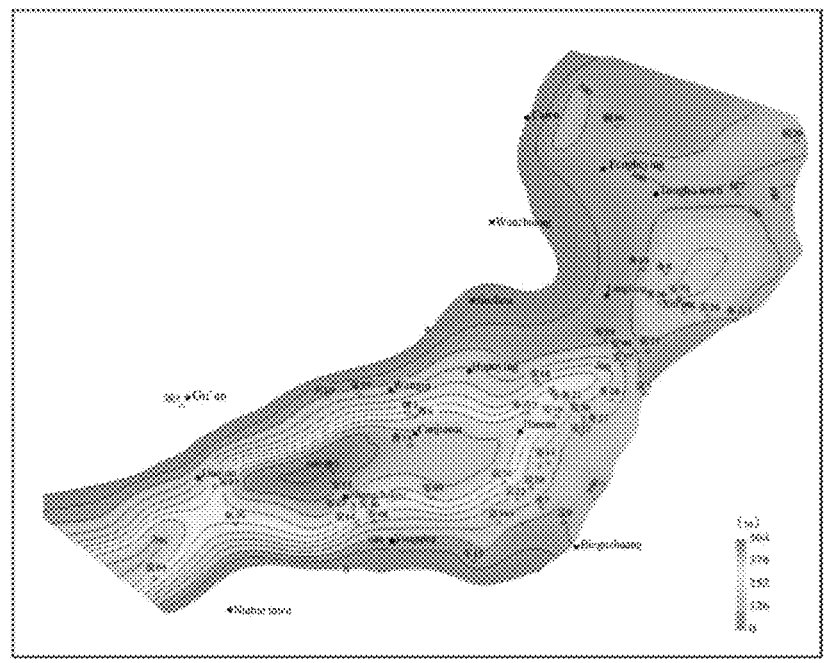
FIG. 10 shows an isopach map of good caprocks in the upper fourth member of the Shahejie Formation according to the present invention.

According to the discovered oil reserve caprocks and taking coring, well logging, mud logging and other data into consideration, the main caprocks in the area is mudstone, and since the permeability is generally lower than $10^{-8}$ $\mu m^2$, it belongs to potential good source rocks. In light of the effect of the thickness values of the caprocks on its sealing ability, when the mudstone is thicker than 1 m, the caprocks will seal some oil and gas columns, and the caprocks with the mudstone thicker than 5 m are considered as good caprocks; through a statistics of the mudstone thicker than 5 m in the well logging and mud logging data and summation of their thickness values, a distribution plan of the good caprocks is prepared to determine planar distribution characteristics of the caprocks (refer to FIG. 10).

7) Evaluation of Transporting Systems

① Vertical Transporting System

A total of 4 Level II faults, 9 Level II faults and 46 Level IV faults in Langgu Sag constitute a vertical transporting system in the area.

② Planar Transporting System

The planar transporting system mainly comprises unconformities and favorable communicating sand bodies. Regional unconformities include unconformities between Carboniferous-Permian System and Kongdian Formation and those between the second member of the Shahejie Formation and Quaternary System, and local unconformities include unconformities between the second member of the Shahejie Formation and the middle third member of the Shahejie Formation and those between the third member of the Shehejie Formation and the upper fourth member of the Shehejie Formation.

③ Characteristics of Planar Combinations of the Transporting Systems

Figure 11:
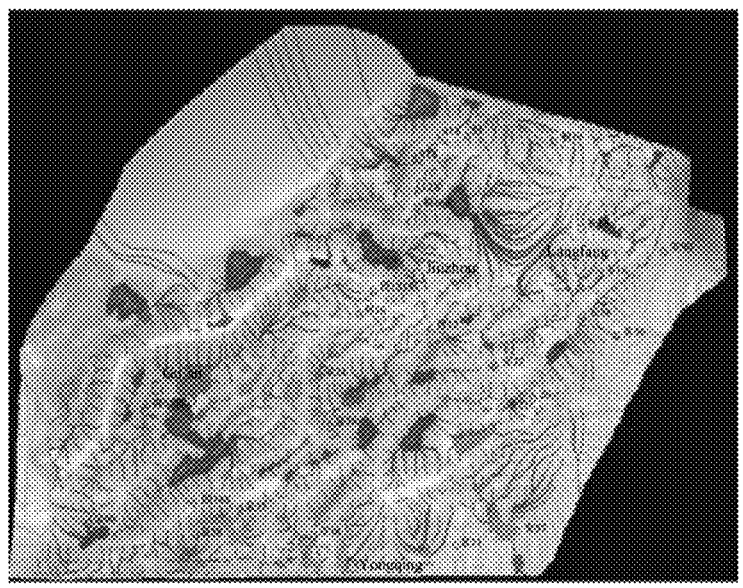
FIG. 11 shows a plan of oil and gas transporting and accumulation in Langgu Sag according to the present invention.

The fourth member of the Shahejie Formation and the Kongdian Formation in Langgu Sag are the main source rocks in the area, wherein oil and gas are vertically migrated upward through the Level II and Level III faults and migrated on a plane through unconformities and favorable transporting sand bodies. The transporting system in the area mainly comprises vertical migration pathways consisting of Level II and Level III faults and planar migration paths consisting of unconformities and favorable sandstone transporting systems (refer to FIG. 11).

8) Selection of target zones and deployment of overall exploration

① Establishment of an Oil and Gas Reservoir Formation Mode

According to the characteristics of sedimentary reservoirs, source rocks and caprocks as well as the distribution of the transporting systems by series of strata, an oil and gas reservoir formation mode is built in the section of the sequence stratigraphic framework. The fourth member of the Shahejie Formation and the lower third member of the Shehejie Formation in Langgu Sag are the main source rocks in the area, wherein oil and gas are transported upward through faults within the source-control range. Hence, a conclusion is drawn that the source rocks communicating with overlying favorable reservoir-caprocks combinations through faults is a crucial condition for oil and gas reservoir formation.

② Determination of Rich Oil and Gas Areas in Distribution

Figure 12:
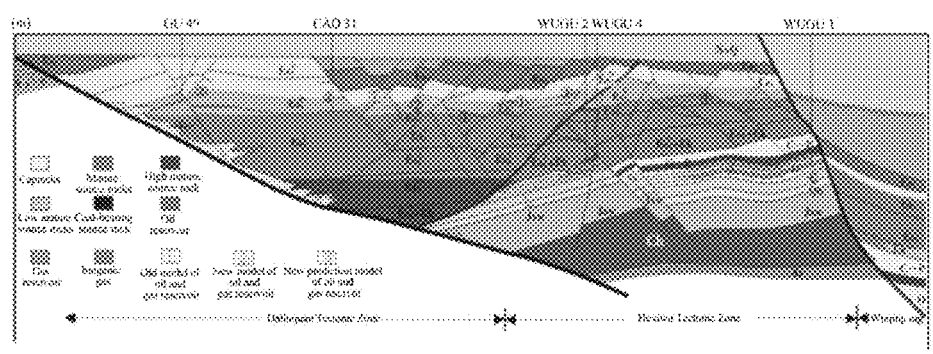
FIG. 12 shows a map of a north wing transporting system and oil and gas reservoir formation mode in the Daliuquan tectonic zone according to the present invention.

Through a planar superimposition of oil and gas reservoir formation elements, favorable oil and gas reservoir areas are distributed in circularity in Langgu Sag, wherein the north wing of the Daliuquan Tectonic Zone is the most favorable area for oil and gas reservoir formation and selected as the target area in the first round of well exploration (refer to FIG. 12).

③ Detailed Description of Oil Reservoirs and Exploration of the First Wells

Upon the determination of the target areas, a detailed study of sedimentary reservoirs is done for key target areas to re-recognize sand bodies, the upper-middle third member of the Shehejie Formation in the area is further divided into four sand sets for a detailed sand contrast and tracking to determine the provenance direction, a control range of the sedimentary systems is defined, and the first wells are explored in the 5 traps including Cao 29X, Cao 31 and the like with major breakthroughs made, wherein the drill of well Cao 31 encountered a 32.4 m thick oil reservoir with a daily oil production of 24.5 $m^3$.

④ Real-Time Adjustment of Potential Oil Reservoir Prediction Results and Implementation of Well Exploration in a Rolling Manner Upon the successful first round of well exploration, the detailed study and recognition are extended to East Liuquan Tectonic Belt and Jiuzhou Tectonic Zone. With highly developed faults and a complicated stratigraphic correlation, the structures are re-interpreted and the analysis of reservoir formation elements is made in more details through a sag-wide 3D high-precision seismic data volume. A total of 4 exploratory wells are successfully used in the second round of exploration, wherein Cao 36x was found with a 52.4 m thick oil reservoir.

In the method, based on the overall exploration idea, 3D seismic data are supplemented and acquired, the sedimentary reservoirs, source rocks, caprocks and oil and gas transporting systems are re-recognized, the north wing of the Daliuquan Tectonic Zone is selected as the target of the first round of exploration through combinational relationships of the reservoir formation elements, and 5 traps are successfully explored in Langgu Sag; upon the successful first round of exploration, the successful experience is extended to the exploration of the Hexiwu Tectonic Zone, Niubei Slope Belt, Zhongchakou, and Fengheying Caiyu Tectonic Zone in succession and breakthroughs are made. A total reserves of 90.47 million ton are proved up, and the overall deployment, overall exploration and massive benefit discovery in the oil-rich sags are realized.

Those skilled in the art can understand that all or some of the steps in the methods of the embodiments above can be completed by a program instructing relevant hardware; the program is stored in a storage medium and composed of a plurality of instructions to make a single-chip micro-computer, a chip or a processor execute all or some of the steps in the methods of the embodiments in the application. And the storage medium above can be a USD flash disk drive, a mobile hard disk drive, a read-only memory (ROM), a random access memory (RAM), a diskette, an optical disk or any other medium able to store program codes.

It is apparent to those skilled in the art that, the details illustrated in the above-mentioned exemplary embodiments are not intended to limit the present invention which can be realized by other specific means without deviating from the spirit and basic characteristics of the present invention. Therefore, in all cases, the embodiments shall be considered illustrative rather than restrictive. The scope of the present invention shall be limited by the Claims attached instead of the Specification above, so all the changes within the significance and scope of the equivalents within the Claims shall be covered by the present invention. Any figure symbols and numbers in the Claims shall not be considered to limit the Claims.

Moreover, it shall be understood that the Specification is described by means of embodiments, but each embodiment does not contain one independent technical solution only. The ways of narration of the Specification are for the sake of clarity only. Those skilled in this art shall take the Specification as a whole and the technical solutions in various embodiments can be properly combined to form other embodiments understandable by those skilled in this art.

What is claimed is:

1. A method for overall exploration of a mature exploration area of oil-rich sags executed by a processor, comprising:

building an area-wide seismic sequence framework for a study area based on uniform 3D seismic data of the study area;

determining spatial distribution characteristics of sedimentary reservoirs in the study area by sequence based on the area-wide seismic sequence framework;

grading source rocks in the study area by sequence based on the area-wide seismic sequence framework;

counting the spatial distribution characteristics of caprocks in the study area;

determining a transporting system for the study area based on a unified 3D seismic data of the study area;

classifying potential trap areas in the study area based on the spatial distribution characteristics of the sedimentary reservoirs and the spatial distribution characteristics of the caprocks; and deploying the overall exploration of the study area based on the classification of the potential trap areas, grading of the source rocks and the transporting system of the study area.

2. The method as claimed in claim 1, wherein the unified 3D seismic data of the study area is obtained through the following steps:

determining areas not meeting requirements for coverage folds of 3D seismic data from a structural distribution map of the study area, preset requirements for coverage folds of 3D seismic data of different tectonic positions and a prior plan of coverage folds of 3D seismic data in the study area;

acquiring 3D seismic data for the areas not meeting the requirements for coverage folds of 3D seismic data to get current 3D seismic data so that the areas meet the requirements for folds of 3D seismic data; and combining the prior 3D seismic data before the acquisition with the current 3D seismic data of the study area to form the unified 3D seismic data of the study area.

3. The method as claimed in claim 2, wherein the preset requirements for coverage folds of 3D seismic data of different tectonic positions include: the range of coverage folds of 3D seismic data of a high slope is 60-80, the range of coverage folds of 3D seismic data of a medium slope is 80-120, the range of coverage folds of 3D seismic data of a low slope is 160-200, and the range of coverage folds of 3D seismic data of an interior of buried hill is 180-220.

4. The method as claimed in claim 1, wherein building an area-wide seismic sequence framework for the study area based on unified 3D seismic data of the study area comprising:

selecting framework wells in the study area, based on the preset conditions for selecting framework wells;

connecting framework wells in the effect range of provenances along the trend and dip direction of a basin or depression to form a cross section transverse to the provenance direction and a cross section along the provenance direction; and finding from the unified 3D seismic data, for each framework well in the cross section transverse to the provenance direction and the cross section along the provenance direction, the seismic reflection in-phase axis of three orders of sequence interfaces corresponding to the framework wells using the synthetic seismogram of the framework wells, and performing in-phase axis tracking in a 3D space according to in-phase axis termination relations of onlap, down-lap, top-lap, and truncation in seismic reflection interface to build the area-wide seismic sequence framework.

5. The method as claimed in claim 1, wherein the spatial distribution characteristics of the sedimentary reservoirs include a location distribution of the sedimentary reservoirs and classifications of the sedimentary reservoirs, and determining the spatial distribution characteristics of sedimentary reservoirs in the study area by sequence based on the area-wide seismic sequence framework comprising:

determining the location distribution of the sedimentary reservoirs in the study area by sequence from the unified 3D seismic data based on the area-wide seismic sequence framework; and determining classification of each of the sedimentary reservoirs according to porosity and permeability of each of the sedimentary reservoirs.

6. The method as claimed in claim 1, wherein grading source rocks in the study area by sequence based on the area-wide seismic sequence framework comprising:

calculating a total organic carbon content (TOC) of the source rocks; and grading the source rocks based on the TOC of the source rocks, wherein the source rocks whose TOC is greater than 2% are determined as good source rocks, the source rocks whose TOC is 1%-2% are determined as medium source rocks and the source rocks whose TOC is 0.5%-1% are determined as poor source rocks.

7. The method as claimed in claim 6, wherein calculating a TOC of the source rocks comprising calculating the TOC of the source rocks using the formula below:

$$TOC = k \times (R - AC) + \Delta TOC$$

wherein TOC represents the TOC of the source rocks, k represents the organic carbon conversion coefficient, $\Delta TOC$ is the background value of TOC of source rocks, AC is interval transit time and R is resistivity.

8. The method as claimed in claim 1, wherein the spatial distribution characteristics of caprocks at least include classifications of the caprocks, and the statistics of the spatial distribution characteristics of the caprocks of the study area comprising:

determining classification of each caprock by air permeability, wherein the caprocks whose air permeability is lower than $10^{-8}$ μm$^2$ are determined as good caprocks, the caprocks whose air permeability is $10^{-8}$-$10^{-7}$ μm$^2$ are determined as medium caprocks, the caprocks whose air permeability is $10^{-7}$-$10^{-6}$ μm$^2$ are determined as average caprocks, and the caprocks whose air permeability is $10^{-5}$-$10^{-3}$ μm$^2$ are determined as poor caprocks.

9. The method as claimed in claim 8, wherein the spatial distribution characteristics of the caprocks also include caprock thickness, wherein the caprocks whose thickness is greater than the preset thickness are determined as effective caprocks.

10. The method as claimed in claim 1, wherein the transporting system comprises a fault transporting system, an unconformity transporting system and a sandstone transporting system, wherein:

the fault transporting system comprises Level I faults and Level II faults, wherein the faults extending between 44 km and 85 km and with the fault throw of 3 km-7 km are level I faults; and the faults extending between 14 km and 30 km and with the fault throw of 150 m-4 km are Level II faults;

the unconformity transporting system comprises Level I unconformities, Level II unconformities and Level III unconformities, wherein Level I unconformities are controlled by regional tectonic activities, Level II unconformities are controlled by episodic tectonic activities, and Level III unconformities are controlled by fluctuations of the lake level; and the sandstone transporting system comprises a Level I transporting sand body, a Level II transporting sand body and a Level III transporting sand body, wherein sandstone percentage of the Level I transporting sand body, the Level II transporting sand body and the Level II transporting sand body is greater than 70%, 50%-70% and 30%-50% respectively.

11. The method as claimed in claim 1, wherein deploying the overall exploration of the study area based on the classification of the potential trap areas, the grading of the source rocks, and the transporting system of the study area comprising:

selecting potential oil reservoir areas based on an ability of different types of potential trap areas communicating with the source rocks through the transporting system;

classifying the potential oil reservoir areas according to grade of the source rocks communicating with the potential oil reservoir areas; and determining a exploration sequence of the study area based on types of the potential oil reservoir areas.

* * * * *